United States Patent [19]

Kern

[11] Patent Number: 4,538,255
[45] Date of Patent: Aug. 27, 1985

[54] METHOD OF AND SYSTEM FOR CUTTING A PHONOGRAPH RECORD WITH TWO-CHANNEL MODULATION

[75] Inventor: Otmar Kern, Berlin, Fed. Rep. of Germany

[73] Assignee: Georg Neumann GmbH, Berlin, Fed. Rep. of Germany

[21] Appl. No.: 544,404

[22] Filed: Oct. 21, 1983

[30] Foreign Application Priority Data

Oct. 22, 1982 [DE] Fed. Rep. of Germany ....... 3239199

[51] Int. Cl.³ .............................................. G11B 3/74
[52] U.S. Cl. ..................................................... 369/51
[58] Field of Search ..................... 369/51, 88, 132, 133

[56] References Cited

U.S. PATENT DOCUMENTS 4,348,754 9/1982 Haynes et al. ......................... 369/51

FOREIGN PATENT DOCUMENTS 2709598 9/1978 Fed. Rep. of Germany .

Primary Examiner—Donald McElheny, Jr.
Attorney, Agent, or Firm—Karl F. Ross; Herbert Dubno

[57] ABSTRACT

A system for controlling the mean depth and spacing of V-grooves cut by a stylus in a phonograph disk for recording stereophonic sounds comprises a processing stage deriving first and second signal components, designed for the vertical and lateral deflection of a stylus support, from advanced left and right preview signals picked up from a storage medium about half a disk revolution ahead of the actual modulation signals. The first signal component is converted into a vertical-deflection signal, integrated with a relatively short time constant, which is admixed—directly and with a delay of one revolution—with the second signal component to produce, after combination with a basic incremental signal, a composite signal which is integrated with a relatively long time constant—on the order of the lead time of the preview signals—to provide a lateral-deflection signal controlling the horizontal shift of the stylus support; the vertical-deflection signal is also used, after a delay also substantially corresponding to that lead time, to control the motion of the stylus support perpendicular to the disk surface.

7 Claims, 4 Drawing Figures

METHOD OF AND SYSTEM FOR CUTTING A PHONOGRAPH RECORD WITH TWO-CHANNEL MODULATION

FIELD OF THE INVENTION

My present invention relates to a method of controlling the mean depth and spacing of V-grooves cut by a stylus into a surface of a rotating phonograph disk, for recording sound signals from two separate channels, and to a system for carrying out this method.

BACKGROUND OF THE INVENTION

In order to record sound signals from two channels, as for the purpose of stereophonic reproduction, the stylus is driven at an inclination of 45° to the disk surface to engrave respective undulations into the two flanks of a V-groove with a 90° vertex angle. The stylus follows a generally spiral path with closely adjoining turns of a given nominal pitch, yet the excursions of the groove flanks due to the modulating signals require some modification of that pitch if the mean spacing of adjacent grooves is to be maintained as small as possible. In general, a predetermined minimum value for the spacing and the depth of the grooves is to be observed.

It is known to generate so-called preview signals which precede the actual modulation signals, picked up from respective tracks of a storage medium such as a magnetic tape, by a certain lead time (preferably on the order of half a disk revolution) designed to allow for a corrective positioning of the stylus support on the basis of the width of the groove previously formed and of the width changes of the current groove due to the forthcoming modulation signals. Thus, the nominal spacing must be increased when the depth (and therefore the width) of either or both of these grooves is larger than normal but can be reduced when it is smaller than normal, thereby allowing better utilization of the available disk area. For this purpose the stylus support is displaceable both vertically—i.e. perpendicularly to the disk surface—and laterally—i.e. horizontally across that surface—under the control of two deflecting signals derived from the aforementioned preview signals. That deflection, however, ought to be so gradual as to avoid audibly perceptible interferences with the recorded sound; thus, the effect of the preview signals upon the deflections of the support is to be spread over the above-described lead time by a conversion of these preview signals into slower-rising deflection signals.

Since the vertical displacement of the stylus support affects both the depth and the width of the groove being cut, it is necessary to take that displacement into account when determining the proper lateral shift of the support. According to the known procedure, therefore, a first and a second signal component derived from the two preview signals are converted—as by integration with suitable time constants—into respective deflection signals of the desired rise time, namely a vertical-deflection signal determining groove depth and a lateral-deflection signal determining groove spacing; the first signal component is also converted into a supplemental signal of the same rise time contributing to the lateral-deflection signal which further contains a basic incremental signal representing the nominal pitch of the spiral path. The incremental signal is summed with the second signal component prior to integration to form a composite signal to which, after conversion into a control signal for the lateral deflector, the supplemental signal is added in part directly (i.e. in real time) and in part after a delay equal to one disk revolution so that the horizontal motion of the stylus support also depends on the width of the groove previously cut.

OBJECT OF THE INVENTION

The object of my present invention is to improve the described procedure with the aim of still better utilizing the available disk area.

SUMMARY OF THE INVENTION

I have found, in accordance with the present invention, that the spreading of the supplemental signal over the lead time of the preview signals before being added to the signal controlling the lateral deflection is not necessary and that perceptible distortions of the recorded sound by the contribution of the first signal component to that lateral deflection will be avoided even if the rise time of this contributing signal is considerably reduced, e.g. to about one-fifth of the lead time referred to. I can therefore add both the real-time portion and the delayed portion of this contributing part of the first signal component directly to the second signal component ahead of its transformation into a lateral-deflection signal of extended rise time so as to form a composite signal consisting of the contributing part of the first signal component, the second signal component and the basic incremental signal.

In contradistinction to the known procedure, therefore, the first signal component is converted into a vertical-deflection signal whose rise time is a small fraction of the lead time and which furnishes the aforementioned contributing part. For the control of the motion of the stylus support perpendicular to the disk surface it is then merely necessary to delay another part of this vertical-deflection signal, without further transformation, for a period long enough to render same effective concurrently with the lateral-deflection signal, i.e. at the end of that lead time.

The vertical-deflection signal obtained from the first signal component may be an amplitude-modulated $\cos^2$ function, i.e. a sinusoidal wave with a d-c component having unipolar peaks of varying magnitude and a cycle length which is short relatively to the lead time. If necessary, the rise time of this vertical-deflection signal may be compensated by a corresponding preliminary delay of the second signal component ahead of the summing stage.

BRIEF DESCRIPTION OF THE DRAWING

The above and other features of my invention will now be described in detail with reference to the accompanying drawing in which.

SPECIFIC DESCRIPTION

Figure 1:
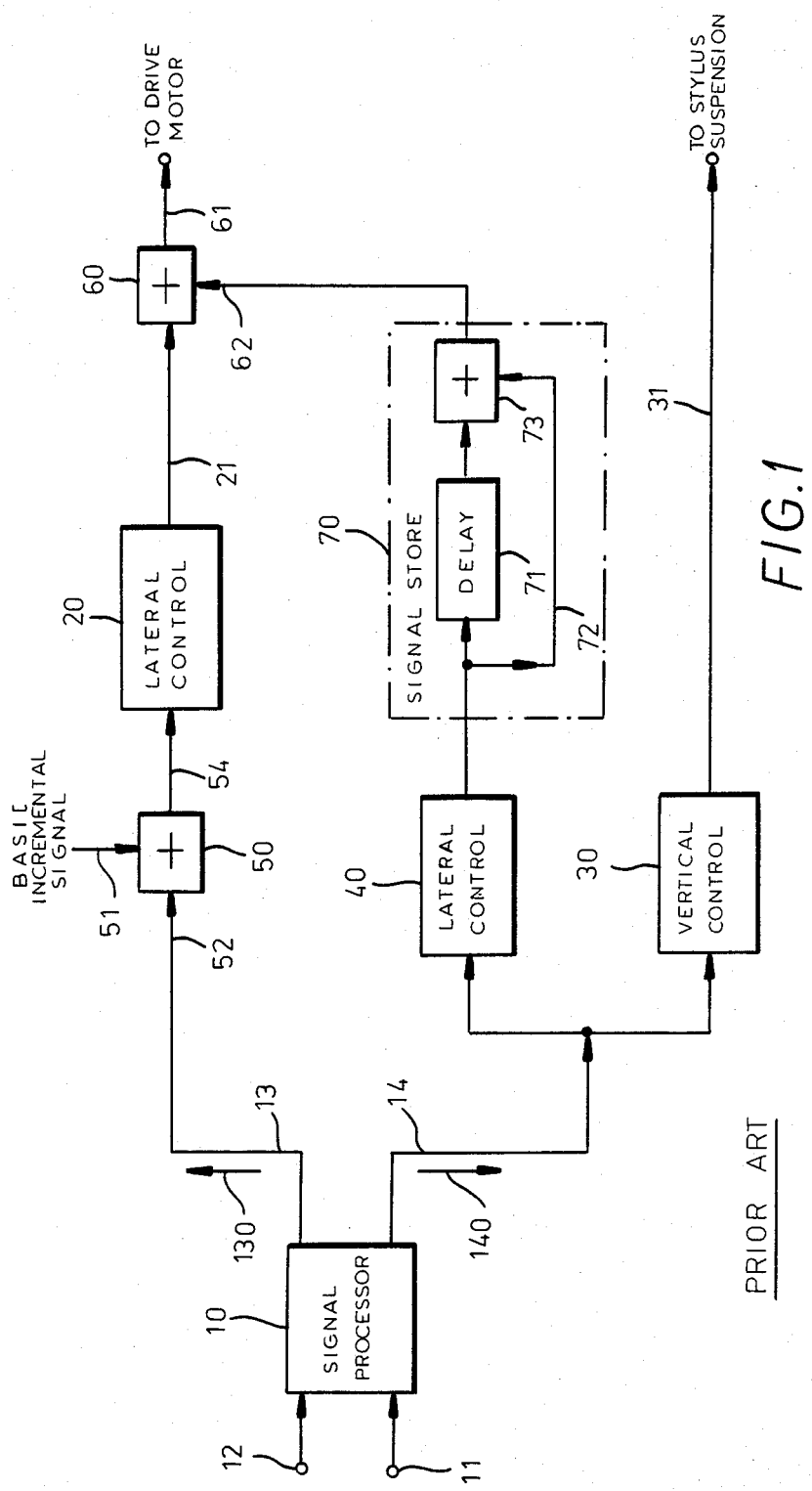
FIG. 1 is a block diagram of a prior-art circuit arrangement for controlling the mean depth and spacing of V-grooves cut into a stereophonic master disk.

FIG. 1 shows two terminals 11 and 12 carrying respective preview signals L and R picked up from a "left" and a "right" track of a nonillustrated magnetic tape on which the sounds have been prerecorded, the pickup occurring at a location preceding that at which the actual modulating signals for the control of a record-cutting stylus are extracted. The lead time intervening between the two pickups equals substantially half a revolution of the master disk, partly shown at 1 in FIGS. 2 and 3, into which V-grooves are being cut.

A signal processor 100 derives from preview signals L and R, by addition and subtraction, a lateral signal component 130 and a vertical signal component 140 fed to respective circuit branches 13 and 14. Branch 13 comprises an adder 50 with a first input 51 connected to a source of a basic incremental signal and a second input 52 receiving the signal component 130. The output 54 of adder 50 delivers a composite signal to a transformation stage 20 converting it into a control signal emitted on a lead 21, this control signal having a rise time corresponding to the lead time of the preview signals.

Signal component 140 is split among two transformation stages 30 and 40, both generally similar to stage 20. Stage 30 derives from signal component 140 a vertical-deflection signal delivered on an output lead 31 to nonillustrated control means associated with a suspension of the stylus support whereby the latter may be raised or lowered to vary the depth of the groove being cut; this deflection signal has a rise time equal to that of the signal on lead 21, and so has a supplemental signal issuing from stage 40. That supplemental signal is transmitted to an input 62 of another adder 60 by way of a signal store 70 including a further adder 73 which receives the signal on a line 72 in real time and via a delay line 71 with a retardation corresponding to one disk revolution. Adder 60 has another input connected to lead 21 and emits on a lead 61 a lateral-deflection signal controlling a motor which drives the stylus support in a generally radial direction across the disk surface.

The two transformation stages 20 and 40 for lateral control and 30 for vertical control may operate in accordance with the disclosure of commonly owned German laid-open application No. 27 09 598, published Sept. 7, 1978. In line with that disclosure, pursuant to an earlier proposal of mine, the outgoing signal on lead 21 is fed back to a comparator which also receives the incoming signal on lead 54 and, if the latter exceeds the former, connects the output of adder 50 to an additive input of another comparator whose subtractive input receives the outgoing signal integrated over the rise time of half a disk revolution. The resulting difference signal (if positive) is sequentially stored, during the same rise time, on a multiplicity of cyclically loaded capacitors working into a diode matrix which selects the largest of the stored samples of feeds it to an impedance converter generating the signal on lead 21. By this means, the so-called residual space otherwise remaining between the envelopes of the transverse excursions of adjacent grooves is more fully utilized.

Figure 2:
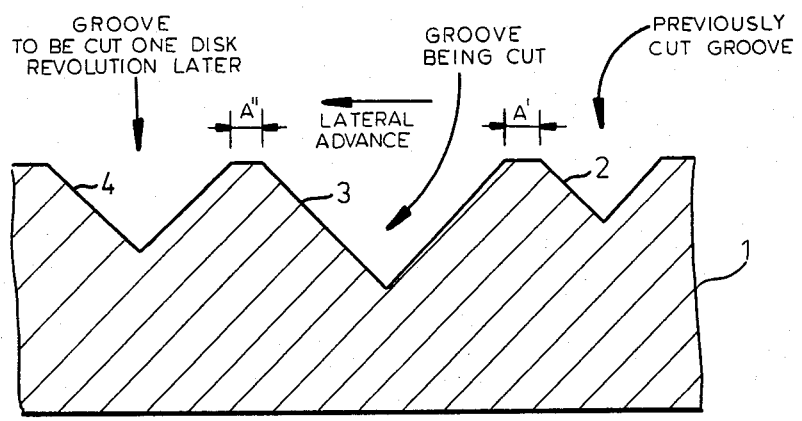
FIG. 2 is an enlarged fragmentary cross-sectional view of the disk, showing three adjoining grooves.
Figure 3:
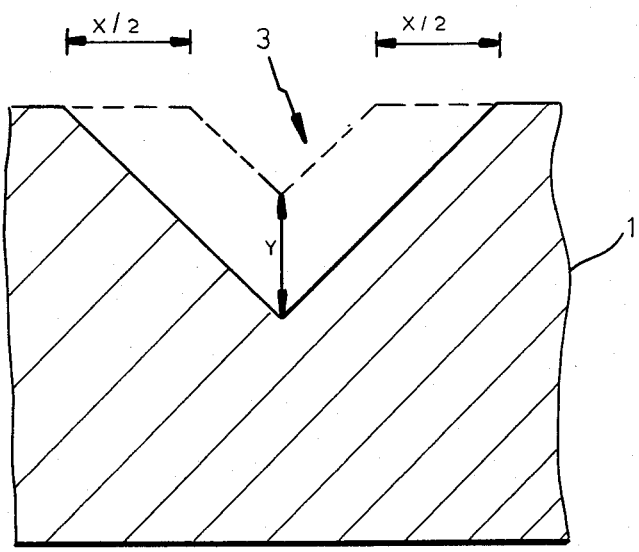
FIG. 3 is a view similar to FIG. 2, showing one of the grooves on a still larger scale.

FIG. 2 shows a previously cut groove 2, a groove 3 being currently cut and a groove 4 to be cut one disk revolution later; the stylus moves from right to left, as indicated by an arrow, under the control of the drive motor performing the lateral deflection. Groove 3 is spaced by a distance A' from the preceding groove 2 and by a distance A' from the subsequent groove 4. As seen in FIG. 3, a deepening of groove 3 by a distance Y results in a widening of the groove by a distance $X=2Y$, the increase at each flank being equal to $X/2=Y$. These values must be taken into account in determining the minimum spacing A' and A" of FIG. 2.

Figure 4:
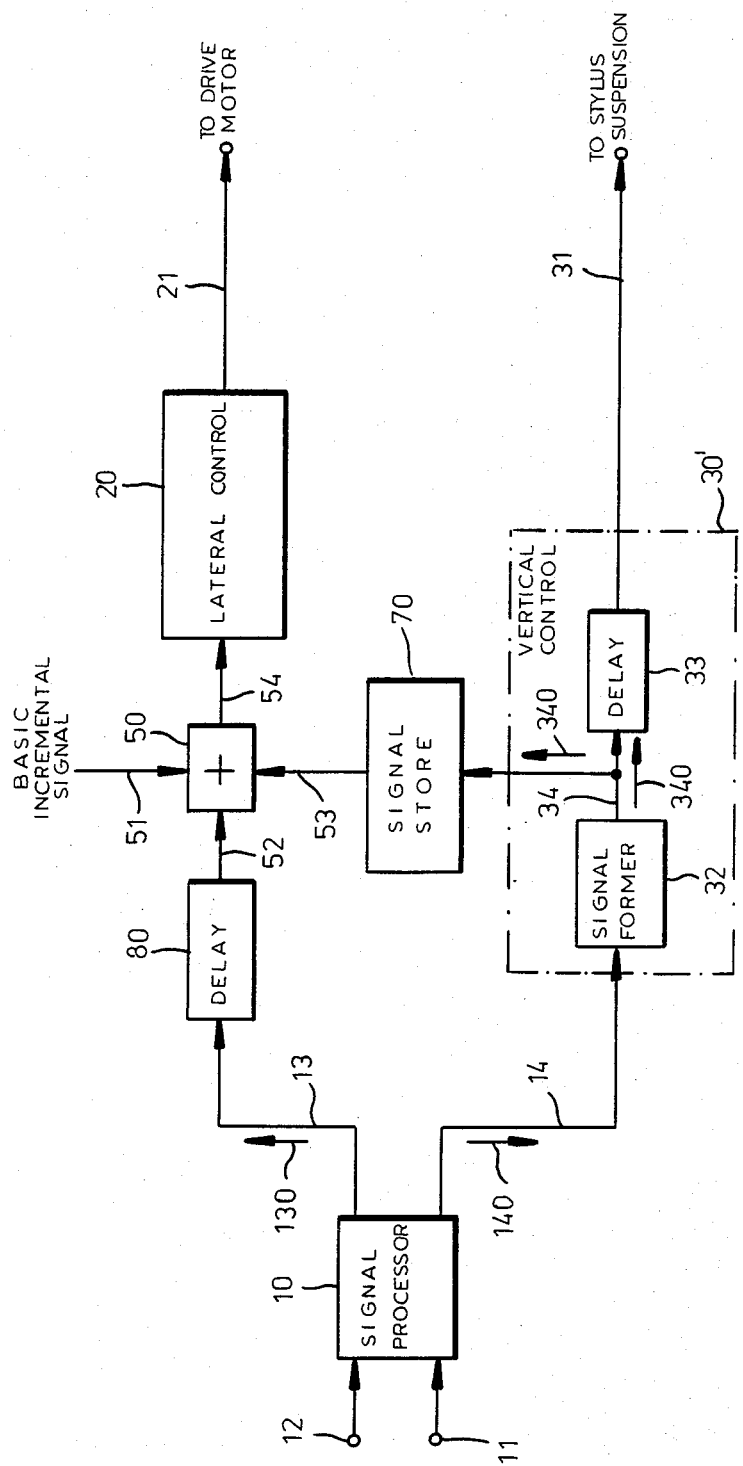
FIG. 4 is a block diagram similar to that of FIG. 1, illustrating my present improvement.

In accordance with my present invention, and as shown in FIG. 4, the contribution of vertical signal component 140 to the lateral-deflection signal fed to the drive motor is no longer averaged over the extended lead time conventionally equaling about half a disk revolution. Instead, signal component 140 is fed to a modified transformation stage 30' including a signal former 32 which differs from the signal accumulator of stage 20 by producing a vertical-deflection signal 340 whose rise time is small compared with the lead time; signal 340, as noted above, may be a sinusoidal wave conforming to an amplitude-modulated $\cos^2$ function. Part of signal 340, appearing in the output of signal former 32, is fed via a store 70—identical with that of FIG. 1—to a third input 53 of adder 50 to produce a composite signal fed to stage 20 for transformation into the lateral-deflection signal on lead 21, with omission of the adder 60 of FIG. 1. Another part of signal 340 passes through a delay line 33 of stage 30', introducing a retardation on the order of magnitude of the lead time, to generate the output signal on lead 31 controlling the suspension of the stylus support.

Also shown in FIG. 4 is an additional delay line 80, upstream of adder 50, which introduces a lag equaling the rise time of signal 340; this lag, when added to the rise time of the signal emitted by state 20, corresponds to the actual lead time and equals the sum of the rise time of signal 340 and the delay in line 33.

As will be noted from a comparison of FIGS. 1 and 4, my present improvement eliminates the transformation stage 40 along with adder 60 and thus significantly simplifies the circuitry. It should also be noted that the reduced rise time of signal 340 enables a better adaptation of the groove spacings A', A" (FIG. 2) to the actual groove widths so as to waste less space on the disk surface.

I claim:

1. A method of controlling the mean depth and spacing of V-groove cut by a stylus into a surface of a rotating phonograph disk for recording sound signals from two separate channels in the form of undulations of respective groove flanks in response to corresponding modulation signals picked up from respective tracks of a storage medium, the stylus being provided with a support movable both perpendicularly to the disk surface and laterally thereacross, comprising the steps of:
   (a) picking up respective preview signals from said tracks with a predetermined lead time in advance of said modulation signals;
   (b) deriving a first and a second signal component from a combination of said preview signals;
   (c) converting said first signal component into a vertical-deflection signal with a rise time which is a small fraction of said lead time;
   (d) combining one part of said vertical-deflection signal with said second signal component and with a basic incremental signal to produce a composite signal;
   (e) deriving from said composite signal a lateral-deflection signal with a rise time on the order of said lead time effective to control a displacement of the stylus support across the disk surface at an instant following by said lead time the pickup in step (a); and
   (f) delaying another part of said vertical-deflection signal to render same effective concurrently with said lateral-deflection signal for controlling a displacement of the stylus support transverse to the disk surface.

2. A method as defined in claim 1 wherein said one part of said vertical-deflection signal is split into a real-time portion and a portion delayed by one disk revolution before being combined in step (d) with said second signal component.

3. A method as defined in claim 2 wherein said lead time substantially equals half a disk revolution.

4. A method as defined in claim 1 wherein said vertical-deflection signal is an amplitude-modulated $\cos^2$ function.

5. A circuit arrangement for controlling the mean depth and spacing of V-grooves cut by a stylus into a surface of a rotating phonograph disk for recording signals from two separate channels in the form of undulations of respective groove flanks in response to corresponding modulation signals picked up from respective tracks of a storage medium, the stylus being provided with a support movable both perpendicularly to the disk surface and laterally thereacross, comprising:

pickup means coacting with said storage medium for extracting respective preview signals from the tracks thereof, said preview signals preceding by a predetermined lead time the modulation signals controlling the stylus;

processing means connected to said pickup means for deriving a first and a second signal component from a combination of said preview signals;

a first and a second circuit branch connected to outputs of said processing means for respectively receiving said first and second signal components therefrom;

first signal-forming means in said first circuit branch for converting said first signal component into a vertical-deflection signal with a rise time which is a small fraction of said lead time;

a source of a basic incremental signal;

adding means in said second circuit branch with inputs connected to said first signal-forming means and to said source for producing a composite signal from said second signal component, from one part of said vertical-deflection signal and from said incremental signal;

second signal-forming means in said second circuit branch downstream of said adding means for deriving from said composite signal a lateral-deflection signal with a rise time on the order of said lead time; and delay means in said first circuit branch downstream of said first signal-forming means for retarding another part of said vertical-deflection signal to render same effective concurrently with said lateral-deflection signal at an instant following by said lead time the extraction of said preview signals by said pickup means, said delay means and said second signal-forming means having output connections extending to respective position-control means for said support.

6. A circuit arrangement as defined in claim 5 wherein said adding means is connected to said first signal-forming means by way of a direct signal path in parallel with a delay line introducing a lag equal to one disk revolution.

7. A circuit arrangement as defined in claim 5 wherein said second circuit branch includes retarding means upstream of said adding means for introducing a lag substantially equal to the rise time of said vertical-deflection signal.

* * * * *